United States Patent
Nishimura

(10) Patent No.: US 9,741,146 B1
(45) Date of Patent: Aug. 22, 2017

(54) KINETIC ENERGY SMOOTHER

(71) Applicant: Electronic Arts Inc., Redwood City, CA (US)

(72) Inventor: Hitoshi Nishimura, Burnaby (CA)

(73) Assignee: Electronic Arts, Inc., Redwood City, CA (US)

( * ) Notice: Subject to any disclaimer, the term of this patent is extended or adjusted under 35 U.S.C. 154(b) by 138 days.

(21) Appl. No.: 14/870,666

(22) Filed: Sep. 30, 2015

(51) Int. Cl.
*G06T 13/00* (2011.01)
*G06T 13/20* (2011.01)
*G06T 13/40* (2011.01)

(52) U.S. Cl.
CPC .............. *G06T 13/20* (2013.01); *G06T 13/40* (2013.01); *A63F 2300/6607* (2013.01); *G06T 2213/12* (2013.01)

(58) Field of Classification Search
CPC .. A63F 2300/6607; G06T 13/20; G06T 13/40
See application file for complete search history.

(56) References Cited

U.S. PATENT DOCUMENTS

| | | | | |
|---|---|---|---|---|
| 6,961,060 B1* | 11/2005 | Mochizuki | ............... | A63F 13/12 345/473 |
| 7,403,202 B1* | 7/2008 | Nash | ....................... | G06T 13/40 345/474 |
| 8,599,206 B2* | 12/2013 | Hodgins | ................. | G06T 13/40 345/473 |
| 8,860,732 B2* | 10/2014 | Popovic | .................. | G06T 13/40 345/473 |
| 2008/0316202 A1 | 12/2008 | Zhou et al. | | |

OTHER PUBLICATIONS

Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.

(Continued)

*Primary Examiner* — Charles Tseng
(74) *Attorney, Agent, or Firm* — Knobbe, Martens, Olson & Bear, LLP

(57) ABSTRACT

Embodiments disclose an animation system designed to generate animation that appears realistic to a user without using a physics engine. The animation system can use a measure of kinetic energy and reference information to determine whether the animation appears realistic or satisfies the laws of physics. Based, at least in part, on the kinetic energy, the animation system can determine whether to adjust a sampling rate of animation data to reflect more realistic motion compared to a default sampling rate.

20 Claims, 9 Drawing Sheets

(56) References Cited

OTHER PUBLICATIONS

Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Georgii et al., "Corotated Finite Elements Made Fast and Stable", Workshop in Virtual Reality Interaction and Physical Simulation VRIPHYS (2008), 9 pgs.
Han et al., "On-line Real-time Physics-based Predictive Motion Control with Balance Recovery," Eurographics, vol. 33(2), 2014, 10 pages.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs , 2010.
Levine, S. et al., "Continuous Character Control with Low-Dimensional Embeddings", Stanford University, University of Washington, 10 pgs , 2012.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
Muller et al., "Meshless Deformations Based on Shape Matching", SIGGRAPH 2005, 29 pgs , 2005.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs, 2014.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Treuille, A. et al., "Near-optimal Character Animation with Continuous Control", University of Washington, 2007, 7 pgs.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Wu et al., "Goal-Directed Stepping with Momentum Control," Eurographics/ ACM SIGGRAPH Symposium on Computer Animation, 2010, 6 pages.
Geijtenbeek, T. et al., "Interactive Character Animation using Simulated Physics", Games and Virtual Worlds, Utrecht University, The Netherlands, The Eurographics Association 2011, 23 pgs.

* cited by examiner

KINETIC ENERGY SMOOTHER

BACKGROUND

A number of applications, such as video games, incorporate animation. Sometimes the animation is pre-generated during creation of the application and is included with the application as a video file. However, in other cases, the animation may be generated during execution of the application. One reason that the animation may be generated during the execution of the application is that the number of possible animations for the application are too numerous to pre-generate for inclusion with the application's data files.

It is often desirable to generate realistic looking animation. One way that developers create realistic animation is to create a physics engine that attempts to model real world physics in the application or video game environment. Because of the complexity of real world physics, using a physics engine can require a significant amount of computational resources. Thus, it is often necessary for a user to have a computing system with a relatively large amount of computational resources, such as a fast CPU and/or GPU and a large amount of memory. Moreover, an application may be limited in the number of characters or objects that can be displayed or interacted with in a particular animation while maintaining realistic looking animation due to the increased amount of computational resources required by the physics engine to model multiple characters or objects in an animation.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One aspect of the present disclosure relates to a computer-implemented method. The method may be implemented by a user computing device configured with specific computer-executable instructions. The method can include accessing a first frame that includes a first pose of a representation of a human. Further, the method may include generating a second frame that includes a second pose of the representation of the human. This second pose may be based on the motion of at least a portion of the representation of the human. In addition, the method may include determining a velocity of the motion of the portion of the representation of the human by at least comparing the first pose to the second pose. Moreover, the method may include calculating a kinetic energy value for the portion of the representation of the human based at least in part on the velocity. The method may further include comparing the kinetic energy value to a reference animation curve corresponding to the portion of the representation of the human and determining whether the kinetic energy value satisfies the reference animation curve. In response to determining that the kinetic energy value does not satisfy the reference animation curve, the method may include resampling motion capture data corresponding to the representation of the human to create an updated second frame.

In certain embodiments, the reference animation curve can include a mapping between kinetic energy values and resampling times. The mapping between the kinetic energy values and the resampling times may be generated based at least in part on realistic motion for the human. In some cases, determining whether the kinetic energy value satisfies the reference animation curve can include determining whether a weight corresponding to an adjustment of a sampling time satisfies a sampling time threshold.

In some cases, resampling the motion capture data corresponding to the representation of the human to create the updated second frame can include determining a resampling time from the reference animation curve based at least in part on the calculated kinetic energy value. Moreover, the method may include resampling the motion capture data based on the resampling time to obtain a set of motion capture data frames. The method may further include blending the set of motion capture data frames and creating the updated second frame based at least in part on the blended set of motion capture data frames as the updated second frame. In some cases, creating the updated second frame further comprises merging the blended set of motion capture data with additional image data included in the second frame.

In some implementations, determining a velocity of the motion of the portion of the representation of the human may include determining a joint velocity for each joint in a plurality of joints associated with the portion of the representation of the human. In some such cases, calculating the kinetic energy value for the portion of the representation of the human further includes calculating, for each of joint in the plurality of joints, a joint kinetic energy value using the joint velocity for the joint. Further, the method may include aggregating each of the joint kinetic energy values to obtain an aggregate kinetic energy value and using the joint kinetic energy value as the kinetic energy value. In certain embodiments, the second frame is generated without using a physics engine. Further, the kinetic energy value comprises, at least in part, a rotational kinetic energy value.

Another aspect of the present disclosure relates to a system that includes an electronic data store and a hardware processor. The electronic data store may be configured to store an application that performs procedural animation. Further, the electronic data store may include non-volatile memory. The hardware processor may be in communication with the electronic data store and may be configured to execute specific computer-executable instructions to at least access a first frame generated by the application. The first frame can include a first pose of a digital object comprising a first part and a second part. Further, the system may generate a second frame that includes a second pose of the digital object. The second pose may be based on motion of the first part with respect to the second part. Moreover, the system may determine a velocity of the motion of the first part by at least comparing the first pose to the second pose. In addition, the system can calculate a kinetic energy value for the first part based at least in part on the velocity of the first part. The system may further determine whether the kinetic energy value satisfies a reference animation curve corresponding to the first part. In response to determining that the kinetic energy value does not satisfy the reference animation curve, the system can resample a set of motion capture data corresponding to the digital object to be included in an updated second frame. In some cases, the system may resample a blended set of motion capture data created by blending a plurality of motion capture data samples. These motion capture data samples may be images or portions of videos. Although primarily described with respect to motion capture data, it should be understood that other types of image and video data may be used with the present disclosure. For example, the system may resample digitized hand drawn animation images and videos.

In some implementations, the hardware processor is further configured to determine whether the kinetic energy value satisfies the reference animation curve by at least accessing a multiplier corresponding to the kinetic energy value in the reference animation curve. The multiplier may correspond to a sampling time adjustment. In addition, the system can determine whether an absolute difference between the multiplier and one exceeds a resampling threshold. Moreover, the hardware processor is further configured to resample the set of motion capture data by at least modifying a sampling period based on the multiplier to obtain a resample time period. In some cases, the hardware processor may resample an animation curve made from blending the set of motion capture data. Further, the system can sample the set of motion capture data at the resample time period to obtain a set of motion capture poses for the digital object. Moreover, the system can blend the set of motion capture poses to create a composite motion capture pose for the digital object. The system can include the composite motion capture pose in the updated second frame. In some cases, including the composite motion capture pose in the updated second frame may further comprises combining the composite motion capture pose with additional images included as part of the second frame.

In some cases, the first part comprises a plurality of joints. In some such cases, the hardware processor is further configured to determine the kinetic energy value for the first part by determining a component kinetic energy value for each joint in the plurality of joints. The system may further include generating the kinetic energy value by aggregating the component kinetic energy value for each joint in the plurality of joints. Moreover, the reference animation curve may be generated automatically using a machine learning algorithm based at least in part on an evaluation of digital object poses for a representative digital object.

Another aspect of the present disclosure relates to a non-transitory computer-readable storage medium storing computer executable instructions that, when executed by one or more computing devices, configure the one or more computing devices to perform operations including accessing a first pose of a digital object comprising a first part and a second part, and generating a second pose of the digital object. The second pose may be based on motion of the first part with respect to the second part. Further, the operations can include determining a kinetic energy value for the first part based at least in part on a difference in a first location of the first part in the first pose and a second location of the first part in the second pose. The operations may further include determining whether the kinetic energy value satisfies a reference kinetic energy mapping corresponding to the first part. In response to determining that the kinetic energy value does not satisfy the reference kinetic energy mapping, the operations may include resampling a set of motion capture data corresponding to the digital object to obtain an updated second pose of the digital object.

In some embodiments, determining whether the kinetic energy value satisfies the reference kinetic energy mapping includes accessing an adjustment value corresponding to the kinetic energy value in the reference kinetic energy mapping. The adjustment value may correspond to a sampling time adjustment. The operations may further include determining whether the adjustment value exceeds an adjustment threshold. In some cases, resampling the set of motion capture data may include modifying a sampling time period used to generate the second pose based on the adjustment value to obtain a modified sampling time period. Further, the operations can include sampling the set of motion capture data using the modified sampling time period to obtain a set of motion capture poses for the digital object and generating the updated second pose using the set of motion capture poses.

In certain embodiments, the operations may further include incorporating the updated second pose of the digital object into a frame comprising a plurality of digital objects. In some cases, the first part comprises a plurality of subparts. In some such cases determining the kinetic energy value for the first part comprises determining a component kinetic energy value for at least some of the subparts of the plurality of subparts. Further, the operations may include determining the kinetic energy value by aggregating the component kinetic energy values for the at least some of the subparts of the plurality of subparts.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Embodiments of the present disclosure enable the generation of realistic procedural animation without the use of a physics engine. Advantageously, by generating the animation without the physics engine, the amount of computational resources used to generate the realistic animation can be greatly reduced. Thus, computer systems may include less resources (such as central processing power, graphics processing power, RAM, video RAM, and the like) to execute an application that uses the embodiments disclosed herein instead of a physics engine. These resources are fewer than the amount of computing resources required by a computer system executing a similar or the same application that incorporates a physics engine. Further, an application using some of the embodiments described herein that is designed for a target computer configuration can include more characters within an animation frame while maintaining realistic movement compared to the same application that utilizes a physics engine.

In certain embodiments disclosed herein, an animation system can determine the kinetic energy value for a portion of an object (for example, a leg of a character) that is in motion. Based on this kinetic energy value, the animation system can determine whether the motion for the portion of the object is realistic. This determination of whether the motion for the portion of the object is realistic may be based on subjective opinions of users and/or constraints based on the laws of physics. Further, determining whether the motion for the portion of the object is realistic may include accessing a reference animation curve generated for the object or the portion of the object that includes weights for adjusting a sampling time of motion capture data. Kinetic energy values that are associated with a realistic motion for the portion of the object can be associated with a weight value of one (1) in the reference animation curve. However, kinetic energy values that are associated with motion that is not realistic may be associated with weight values other than one (1) that can be used to adjust the sampling time of the motion capture data. By adjusting the sampling time of the motion capture data, the kinetic energy of the portion of the object can be increased or decreased by speeding up or slowing down the animation for the portion of the object.

Example Game System

Figure 1:
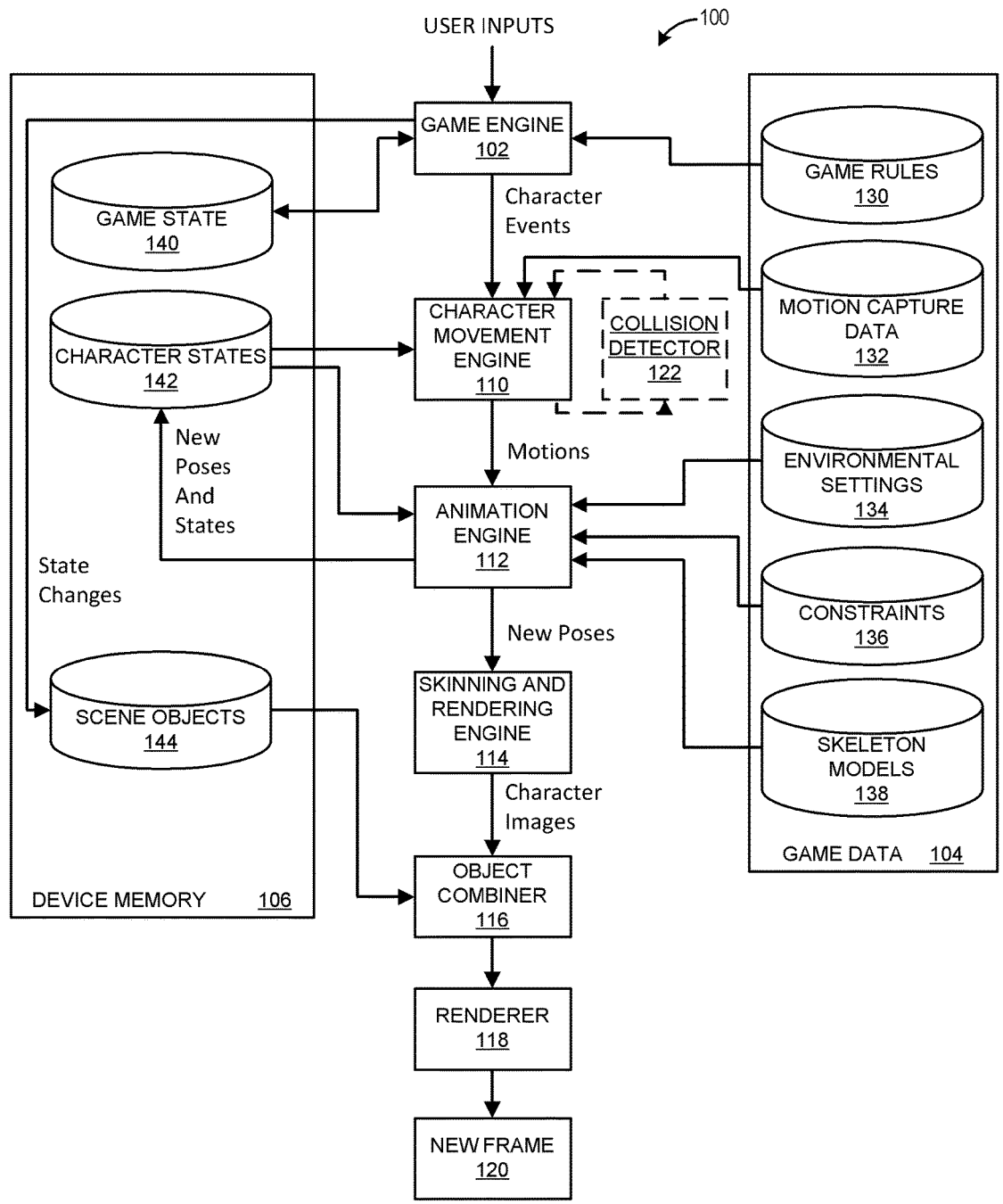
FIG. 1 illustrates an embodiment of elements of a game system.

FIG. 1 illustrates an embodiment of some elements of a game system 100. The game system 100 may be involved in the execution of gameplay within a game application, which is also referred to as a videogame or game herein. Aspects of the game system 100 may be part of a computing device, which is described in more detail herein. Further, aspects of the game system 100 provide for receiving user input to control aspects of the game according to game rules 130. Game rules 130 might be specified in instruction form on game media, such as CD-ROM, DVD, USB memory, and the like. Examples of game rules 130 can include rules for scoring, possible inputs, actions/events, movement in response to inputs, and the like. Other components can control what inputs are accepted, how the game progresses, and other aspects of gameplay. The elements in FIG. 1 illustrate elements used for generating and rendering animation within the game based on various inputs.

As shown in FIG. 1, by system 100, user inputs and game code/data may be used to generate video for display. The game system may also handle playing the game and presenting corresponding audio output. The description of FIG. 1 is focused on generating frames of display video for the game. A game engine 102 can receive the user inputs and determine character events, such as actions, collisions, runs, throws, attacks and other events appropriate for the particular game.

The character events may be conveyed to a character movement engine 110 that can determine the motions the characters should make in response to the events. These motions may be provided to an animation engine 112. The animation engine 112 determines new poses for the characters and provides those new poses to a skinning and rendering engine 114. The animation engine 112 can also determine whether the resulting pose satisfies a measure of realism based on animation constraints or an animation reference curve stored within the constraints repository 136. The animation engine 112 is described in more detail below with respect to FIG. 2.

The skinning and rendering engine 114 can provide character images to an object combiner 116 to combine animate, inanimate and/or background objects into a full scene. The full scene may be conveyed to a renderer 118, which can generates a new frame 120 based at least in part on the full scene.

Game code/data 104 is shown comprising game rules 130, prerecorded motion capture poses/paths 132, environmental settings 134, constraints 136 (such as strength, velocity, kinetic energy constraints, and the like), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths from a motion capture data repository 132 as well as character states 142. The motion capture data repository 132 can store motion capture video and/or motion capture images that may be used to generate procedural animation. The character movement engine may provide the prerecorded poses/paths from the motion capture data repository 132 to the animation engine 112, which can generate character poses based, at least in part, on sampling the motion capture data provided by the character movement engine 110. It should be understood that the character movement engine 110 and the animation engine 112 may generate poses for both playable characters and non-playable characters, which are sometimes referred to as NPCs. Further, in some embodiments, the character movement engine 110 and the animation engine 112 may be used to provide animation motion for any digital object or object in a game and is not limited to characters, playable or otherwise. For example, animation of interactive elements within the game or scenery may be generated by the character movement engine 110 and the animation engine 112. An optional collision detector engine 122 can perform a process that can derive the desired motions for characters based on collisions. Motions might be expressed as a set of external forces, target poses and the like.

In some embodiments, the character movement engine 110 can work in conjunction with the animation engine 112 to create a procedural animation. In some such embodiments, the animation engine 112 may generate a target pose for an object or character in response to, for example, a collision detected by the collision detector 122. The target pose may be generated on a frame-by-frame basis and can be based, at least in part, on one or more constraints included in the constraints repository 136. For example, the target pose may be based, at least in part, on a current pose of the character, the impact of a collision force, and/or a gravitational value. As a second example, the target pose may be based, at least in part, on user commands, such as a command to move a character, or change the movement rate or direction of the character.

The character movement engine 110 and/or the animation engine 112 can use the target pose to identify one or more motion capture images included in the motion capture data 132, which may be provided to the skinning and rendering engine 114. In some cases, the one or more motion capture images may be blended by the animation engine 112 and/or the object combiner 116 to create a single image. Further, in some cases, the identified motion capture image may have slight variations from the target pose. Thus, in some such cases, the target pose may be updated based on the selected motion capture image. Further, the updated target pose may be used as the current pose for a subsequent frame and the process of selecting a motion capture image may be repeated. Advantageously, in certain embodiments, using the target pose to select a motion capture image and updating the target pose based on the motion capture image enables more fluid procedural animation compared to pre-existing processes. Further, the use of procedural animation can result in a larger variety of animation within a game while reducing storage space for the game data 104 of a game.

As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig may comprise a skeletal structure for a character and may include a plurality of degrees of freedom. A rig may also comprise a set of animation controls that enable an animator to move the various components of the character in order to create motion in an animation. Character movement engine 110 might also introduce character movements for randomness, personality, and so forth.

The inputs to the animation engine 112 may include the skeleton models of various characters, environmental settings 134, character states such as current poses (for example, positions of body parts expressed as positions, joint angles or other specifications), and constraints, which may include velocities (linear and/or angular) of body parts and motions provided by character movement engine 110, which can be in the form of a set of force/torque vectors for some or all body parts. In some cases, the constraints may include animation reference curves, which can be used to identify a sampling weight for determining a sampling time for sampling the motion capture data provided to the animation engine 112. From the inputs to the animation engine 112, the animation engine 112 generates new poses for the characters using rules of physics and those new poses can be used to update character states 142 and are also provided to rendering engine 114. Where invisible skeleton models are used, character states 142 may include the current position of the visible "graphics" of characters as well as the invisible rag-doll skeleton characters.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

Example Animation Engine

Figure 2B:
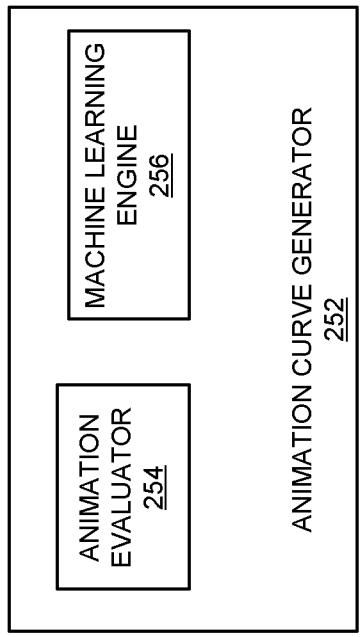
FIG. 2B illustrates an embodiment of an animation curve generator.
Figure 2A:
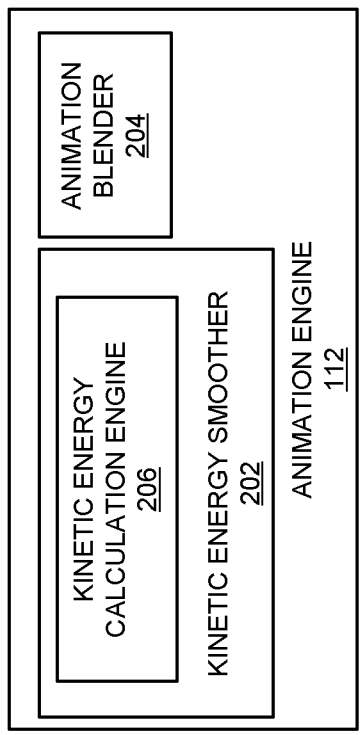
FIG. 2A illustrates an embodiment of an animation engine that includes a kinetic energy smoother.

FIG. 2A illustrates an embodiment of an animation engine 112 that includes a kinetic energy smoother 202. The kinetic energy smoother 202 can be used to help generate more realistic animation without the use of a physics engine. In certain embodiments, the kinetic energy smoother 202 can use a kinetic energy calculation engine 206 to calculate or determine the kinetic energy for an object, such as a character that is in motion, or a portion of an object, such as a leg or arm of the character. In some embodiments, the calculated kinetic energy may be translational kinetic energy, rotational kinetic energy, or a combination of translational and rotational kinetic energy.

The animation engine 112 may also include an animation blender 204. The animation blender 204 may blend multiple motion capture frames for the object to create a single pose or frame for the object. By using the kinetic energy smoother 202 and the animation blender 204, the animation engine 112 can use motion capture data to create realistic looking procedural animation while reducing texture defects or imperfections.

For instance, suppose that a user is causing a human character that is initially in a walking state or a non-moving state to enter a running state. The kinetic energy smoother 202 may determine, based on comparing the kinetic energy calculated for a human leg with a reference animation curve generated for the human leg, that the motion of the human leg is unlikely to appear realistic to a user. This reference animation curve may include a mapping between sampling time points in the motion capture data and various kinetic energy values. Further, this mapping may be generated based on constraints for a human leg. It should be understood that a different mapping or reference animation curve may be generated for a human arm or a leg of another animate object, such as a cat. In some cases, the reference animation curve may include a reference animation created based on constraints applied to the object (for example, the human leg).

Continuing the example, if it is determined that the motion of the human leg does not satisfy the animation curve based on the determined kinetic energy for the human leg, the animation engine 112 may use the kinetic energy smoother 202 to resample the motion capture data at a different time point, which may be determined based at least in part on the reference animation curve. In cases where the motion capture data includes a plurality of motion capture frames, the sample motion capture data frames may be blended by the animation blender 204 to create a single frame or pose for the character.

Advantageously, in certain embodiments, the kinetic energy smoother 202 can facilitate generating more realistic animation compared to other procedural animation systems. Further, the animation engine 112 with the kinetic energy smoother 202 can generate the animation without using a physics engine while still generating realistic looking animation. Advantageously, by generating the animation without a physics engine, the animation engine 112 can animate a greater number of characters while using less computing resources (such as less computational cycles and less memory) compared to system that incorporates a physics engine.

The reference animation curve may be generated by the animation engine 112. Alternatively, the reference animation curve may be generated by an animation curve generator, which may be included as part of the system 100 or as part of a separate system, such as a developer computer system. FIG. 2B illustrates an embodiment of an animation curve generator 252 that can be used to generate the reference animation curve.

The animation curve generator 252 can include an animation evaluator 254 that can present a number of animations of a digital representation of an object to a number of users. These animations may be created based on motion capture data. Typically, the object is something that is constrained by the laws of physics in how it can move. For example, a human is limited by real world constraints on how he or she can move his or her appendages. The animation evaluation 254 can receive feedback from the users regarding whether the animation of the object appears realistic. Based on this collected feedback, the machine learning engine 256 can develop a reference animation curve for the object. This reference animation curve can include mappings between the kinetic energy associated with the object in motion and the timing of samples of motion capture data. In certain embodiments, the animation engine 112 can use the reference animation curve to facilitate generating animation that reflects how the object is capable of moving in the real world.

Example Realistic Animation Detection Process

Figure 3:
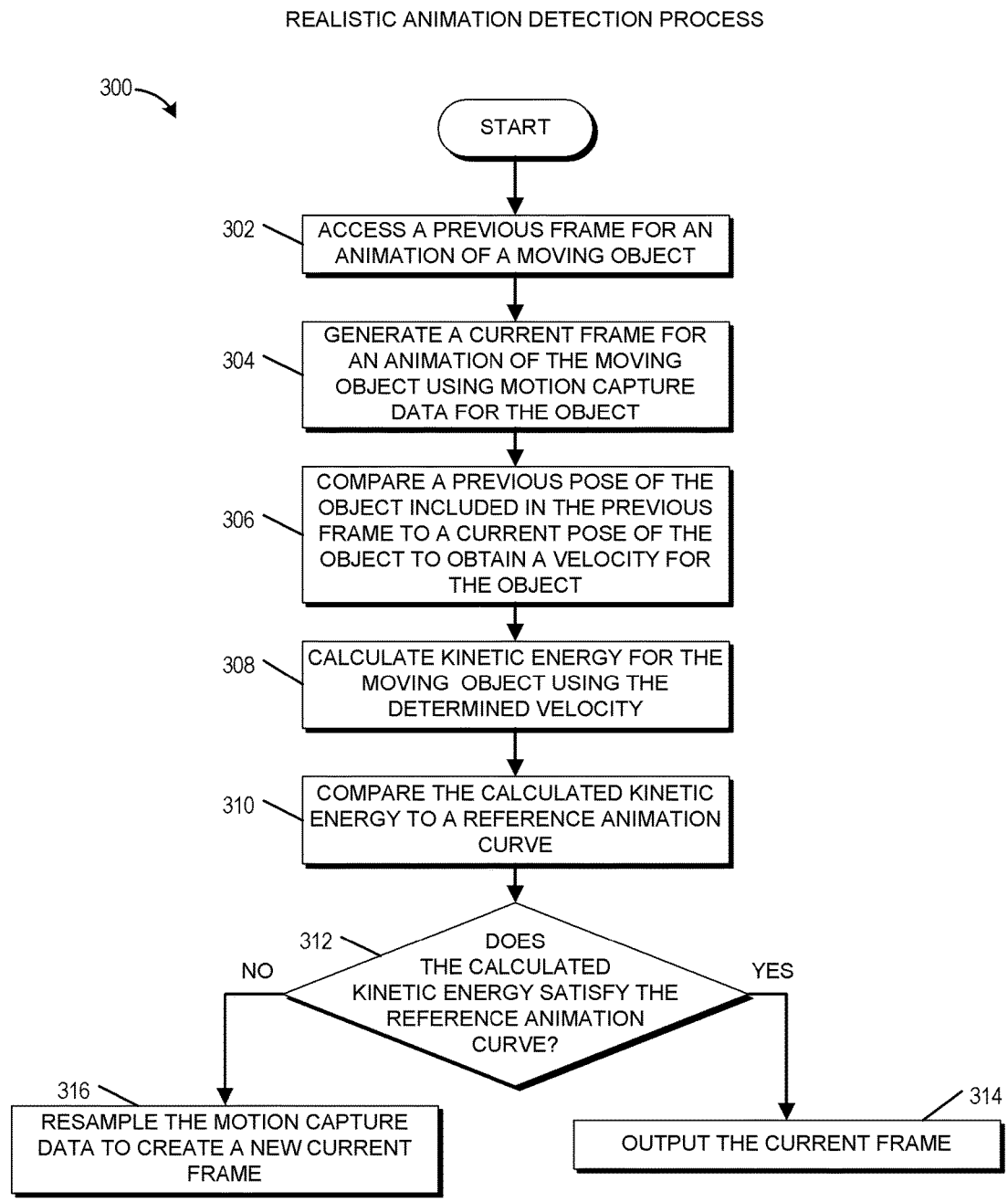
FIG. 3 presents a flowchart of an embodiment of a realistic animation detection process.

FIG. 3 presents a flowchart of an embodiment of a realistic animation detection process 300. The process 300 can be implemented by any system that can use the kinetic energy of a character or object to determine whether animation of the character or object is realistic and that can modify the animation if it is determined that the animation is not realistic. For example, the process 300, in whole or in part, can be implemented by an animation engine 112, a kinetic energy smoother 202, a kinetic energy calculation engine 206, or an animation blender 204, among others. Although any number of systems, in whole or in part, can implement the process 300, to simplify discussion, the process 300 will be described with respect to particular systems.

The process 300 begins at block 302 where, for example, the animation engine 112 accesses a previous frame for an animation of a moving object. This moving object may include a representation of a human or any other character or object with movable parts or features, such as, but not limited to, appendages. In some embodiments, the moving object may include an object that moves one portion with respect to another portion. For example, the object may include a human or an animal that moves its legs with respect to its torso. In some cases, the object may be an inanimate object that includes one portion that can be moved with respect to another portion. For example, the object may be a car with a door that can be moved with respect to the body of the car.

At block 304, the animation engine 112 generates a current frame for an animation of the moving object using motion capture data, or other animation data, for the object obtained from the motion capture data repository 132. In some cases, generating the current frame may include sampling a motion capture video at a particular point in time. In other cases, generating the current frame may include sampling a plurality of motion capture videos at a particular point in time to obtain a plurality of samples of the motion capture data. The plurality of samples of motion capture data may then be blended together to form the current frame of block 304. Typically, but not necessarily, motion capture data is sampled at an application-specific period of time. For example, motion capture data may be sampled in a period of time that is 1/30th of a second later in time than the previously generated frame. In other words, each frame may be 1/30th of a second later than the previous frame, and thus, the animation may be generated or displayed at 30 frames per second. In some cases, a motion capture data may be divided into time segments refer to as tics. Each tic may be 1/60 of a second and thus, 1/30 of the second may be referred to as two tics.

At block 306, the kinetic energy calculation engine 206 compares a previous pose of the object included in the previous frame to a current pose of the object included in the current frame to obtain a velocity for the object. This velocity may be a translational velocity, a rotational velocity, or a combination of a translational and a rotational velocity. In cases where the velocity is a combination of a translational and a rotational velocity, the kinetic energy calculation engine 206 may identify the constituent components of the velocity. In some embodiments, block 306 includes determining a velocity for a portion of the object. For example, if the object is a human character and the human character is moving its arm, the velocity determined may be for the movement of the arm. Further, in some cases, the object may be represented by a series of joints and rods that connect the joints. For example, supposing that the object is a representation of a human hand, the object may include a joint or node for each joint within the fingers of the hand and a set of rods that connect each of the joints to form the representation of the human hand. In some cases, the block 306 may include determining a velocity associated with each of the joints or nodes for the object. Further, block 306 may include aggregating each of the velocities determined for the joints or nodes of the object into a single velocity value.

The kinetic energy calculation engine 206, at block 308, calculates the kinetic energy for the moving object using the velocity determined at the block 306. In some cases, the kinetic energy calculation engine 206 may determine a separate kinetic energy component based on the determined rotational velocity and a separate kinetic energy component based on the determined translational velocity. In some embodiments, block 308 may include calculating a kinetic energy for each joint within an object or a portion of an object that is identified as being in motion. In some cases, each of the kinetic energy values determined for a plurality of joints of an object or a portion of an object in motion may be aggregated to determine a single kinetic energy value.

At block 310, the kinetic energy smoother 202 compares the calculated kinetic energy to a reference animation curve. This reference animation curve may be accessed from the constraints repository 136. In some cases, the reference animation curve may be a map that associates different kinetic energy values with weights. These weights may be used to modify the sampling time for animation data. This animation data may be created, for example, by blending motion capture data or videos. In some cases, motion capture data may be used without blending. In other cases, the motion capture data is blended before it is sampled. In other cases, the motion capture data may be blended after it is sampled. In one example, if a particular kinetic energy value is associated with a weight of one (1), then the sampling value for sampling time period may remain unmodified. However, in another example, if a particular kinetic energy value is associated with a weight of 0.5, the sampling time period may be reduced in half. Thus, if the animation engine 112 previously sampled the animation data every two tics or 1/30th of a second, the kinetic energy smoother 202 would sample the animation data at one tic or 1/60th of a second for the current frame. Often, this animation data may be motion capture data. However, it should be understood that this disclosure is not limited to motion capture data. The application data may include other types of image and video data. For example, the animation data may include hand drawn animation that may then be digitized for access by a computing system. As another example, the animation data may be computer animation created using animation software.

Alternatively, or in addition, the reference animation curve may map or associate different kinetic energy values with different sampling times for the animation data. As another alternative, the reference animation curve may include target kinetic energy values and/or may include adjustments to the motion capture data sampling times based on differences between the target kinetic energy values and a measured or determined kinetic energy value. For example, if it is determined that a kinetic energy value for an arm is twice as much than a target kinetic energy value identified in the reference animation curve, the sampling time may be adjusted in half or in a quarter so as to slow down the motion of the arm in the animation. Typically, the kinetic energy values of the reference animation curve and/or the sampling times for the motion capture data identified in the reference animation curve are determined based on real-life or realistic movement for the object. In other words, the sampling times or weights included in the reference animation curve for modifying sampling times may be selected based on the degree of rotation of a human arm or the length of a step of a human leg that is possible based on the laws of physics or whether the appearance is realistic to a particular user, a particular set of users, or the average user.

In some embodiments, the reference animation curve may include kinetic energy constraints or movement constraints corresponding to a position of a portion of an object. In some such cases, the constraints may be indexed by kinetic energy values. Thus, in some cases, a kinetic energy value can be used to determine whether a constraint for the object is satisfied or not.

In some embodiments, the kinetic energy value determined at block 308 is one of a plurality of factors used to determine the sampling time for the animation data. In some cases, additional parameters, such as inertia, may be used to facilitate selecting an animation data sampling time.

In some cases, the reference animation curve may be generated using machine learning algorithms and/or user feedback provided for sample animations. An example process for generating a reference animation curve using machine learning algorithms is described in more detail below with respect to FIG. 5. Alternatively, the reference animation curve may be based on one or more heuristic algorithms.

The kinetic energy smoother 202 determines at the decision block 312 whether the calculated kinetic energy satisfies the reference animation curve. In some embodiments, determining whether the calculated kinetic energy satisfies the reference animation curve may include determining whether a non-identity weight or a weight other than the value of one (1) is mapped to the calculated kinetic energy. In other embodiments, determining whether the calculated kinetic energy satisfies the reference animation curve may include determining whether the calculated kinetic energy is within a threshold difference of a target kinetic energy corresponding to a relative location of the moving portion of the object.

If it is determined at the decision block 312 that the kinetic energy does satisfy the reference animation curve, or is at least within a threshold difference of a target value included in the reference animation curve, the animation engine 112 outputs the current frame at block 314. In some cases, the animation engine 112 may provide the current frame to a skinning and rendering engine 114 or to some other system for further processing, such as the renderer 118.

If it is determined at the decision block 312 that the calculated kinetic energy does not satisfy the reference animation curve, the kinetic energy smoother 202 resamples the animation data to create a new current frame at block 316. A number of processes are possible for resampling the animation data. Some examples of a process for resampling the animation data is described below with respect to FIG. 4.

Example Animation Resampling Process

Figure 4:
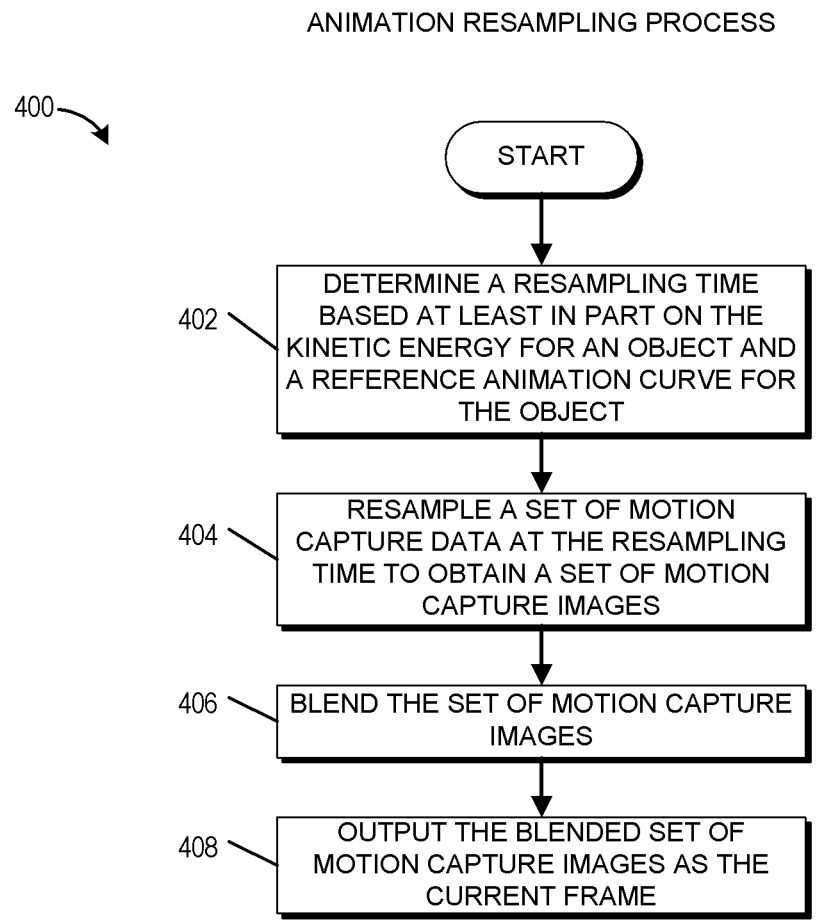
FIG. 4 presents a flowchart of an embodiment of an animation resampling process.

FIG. 4 presents a flowchart of an embodiment of an animation resampling process 400. The process 400 can be implemented by any system that can create an animation frame by resampling motion capture data. For example, the process 400, in whole or in part, can be implemented by an animation engine 112, a kinetic energy smoother 202, a kinetic energy calculation engine 206, or an animation blender 204, among others. Although any number of systems, in whole or in part, can implement the process 400, to simplify discussion, the process 400 will be described with respect to particular systems.

In certain embodiments, the process 400 may be performed as part of or in conjunction with the process 300. For example, some or all of the process 400 may be performed as part of the block 316.

The process 400 begins at block 402 where, for example, the kinetic energy smoother 202 determines a resampling time based, at least in part, on the kinetic energy for an object and a reference animation curve for the object. Determining the resampling time may include looking up the kinetic energy in the reference animation curve to determine a weight for a modification to a default, standard, or application-specific sampling time for motion capture data for a specific application. In some cases, the block 402 includes modifying a particular animation data sampling time by the weight identified in the reference animation curve. Usually, the weight will be a fraction or less than one (1) thereby reducing the sampling time from, for example, two tics, or ⅟30 of a second, to some value less than two tics. Typically, the reduction of the sampling time causes animation to be slowed down, which may correspond to a reduced kinetic energy. However, in some cases, the weight may be greater than one (1) thereby resulting in an increase to the sampling time and correspondingly, speeding up an animation.

At block 404, the kinetic energy smoother 202 samples or resamples animation data based on the resampling time determined at the block 402 to obtain a set of animation images. In some cases, the animation data may be a set of motion capture data. Further, the set of animation images may be a set of motion capture images. In some cases, the set of motion capture data may include snippets or portions of motion capture video. Further, the set of motion capture data may include one or a plurality of portions of motion capture video. Thus, in some cases, the set of motion capture images may include one motion capture image or a plurality of motion capture images.

At block 406, the animation blender 204 blends the set of animation images, or motion capture images. Blending the set of motion capture images may include generating a single image based on the set of motion capture images. The block 406 may use any type of blending algorithm. For example, the block 406 may use an arithmetic blending algorithm, a Boolean blending algorithm, a multiply and screen blending algorithm, or any other type of algorithm that can be used to blend multiple images into one image. In some embodiments, the block 406 may be optional or omitted. For example, in cases where the set of motion capture images comprises a single motion capture image, the block 406 may be omitted. In other embodiments, the animation or motion capture images may be blended during application development. In such cases, the block 404 may include resampling the blended set of animation data or motion capture data. Thus, in such cases, the block 406 may be omitted. Advantageously, in certain embodiments, using pre-blended motion capture images may reduce the computing resources used during execution of the application by users or end-users.

At block 408, the animation engine 112 outputs the blended set of animation images or motion capture images as the current frame. In some embodiments, the animation engine 112 outputs the blended set of motion capture images as a pose of the object to be included in a frame created by the renderer 118.

Figure 5:
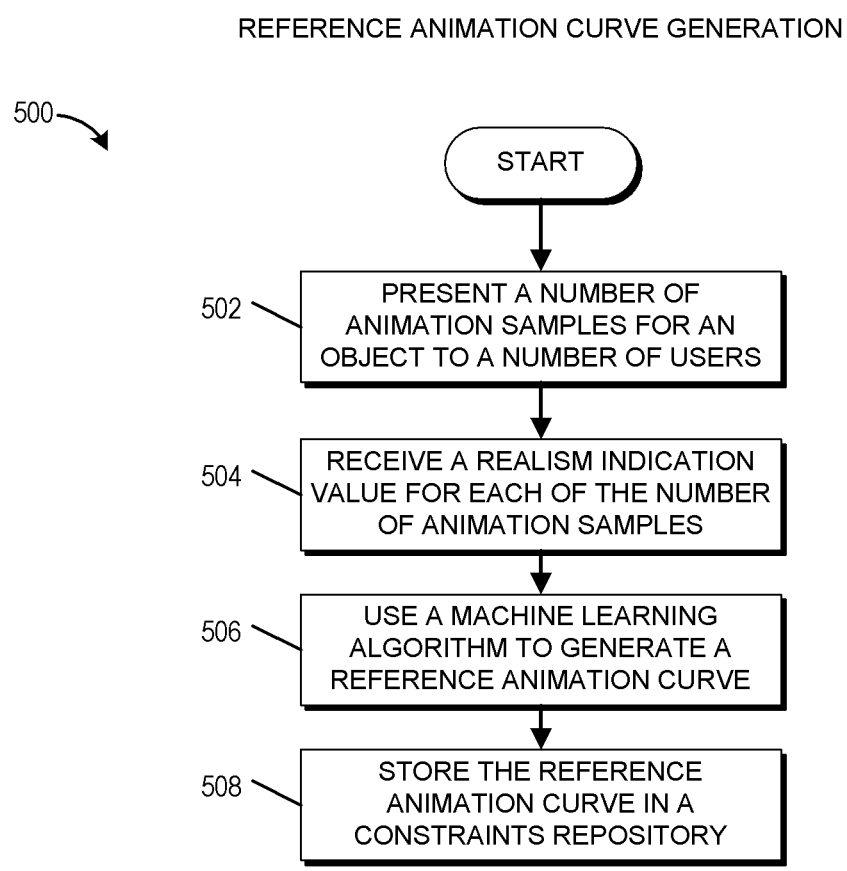
FIG. 5 presents a flowchart of an embodiment of a reference animation curve generation process.

Advantageously, in certain embodiments, the use of the processes described with respect to FIGS. 4 and 5 are relatively lightweight compared to using a physics engine. In other words, generating the procedural animation using the kinetic energy smoother 202 in the processes described herein uses less computational resources for a computer system than the use of a physics engine. This reduction in the use of computational resources enables the generation of realistic looking animation for a greater number of characters within a frame compared to a system that uses a physics engine. Moreover, using the kinetic energy smoother 202 to resample motion capture data enables the preservation of texture information for characters and objects.

Example Reference Animation Curve Generation Process

FIG. 5 presents a flowchart of an embodiment of a reference animation curve generation process. The process 500 can be implemented by any system that can create a reference animation curve. For example, the process 500, in whole or in part, can be implemented by an animation engine 112, an animation curve generator 252, an animation evaluator 253, or a machine learning engine 256, among others. Although any number of systems, in whole or in part, can implement the process 500, to simplify discussion, the process 500 will be described with respect to particular systems.

The process 500 begins at block 502 where, for example, the animation curve generator 252, using the animation evaluator 254, presents a number of animation samples for an object to a number of users. These animation samples may be snippets of motion capture video or snippets of procedural animation generated by an application.

At block 504, the animation evaluator 254 receives a realism indication value for each of the number of animation samples. This realism indication value may be an aggregation of ratings by the users indicating how realistic the motion of an object appears in the number of animation samples. For example, a set of users may rate the animation samples presented at the block 502 based on how realistic movement of characters within the animation appears to the users. Thus, a character that appears to move more realistically may be rated higher than a character that appears to move less realistically.

At block 506, the machine learning engine 256 uses a machine learning algorithm to generate a reference animation curve based on the realism indication values for each of the number of animation samples. In some cases, the block 506 may include using a plurality of machine learning algorithms to generate the reference animation curve. The machine learning algorithms can include the use of clustering and/or neural networks to generate the reference animation curve.

At block 508, the animation curve generator 252 stores the reference animation curve in a constraints repository 136. Alternatively, the animation curve generator 252 may store the reference animation curve in a separate repository.

Comparative Examples of Generated Frames

Figure 6:
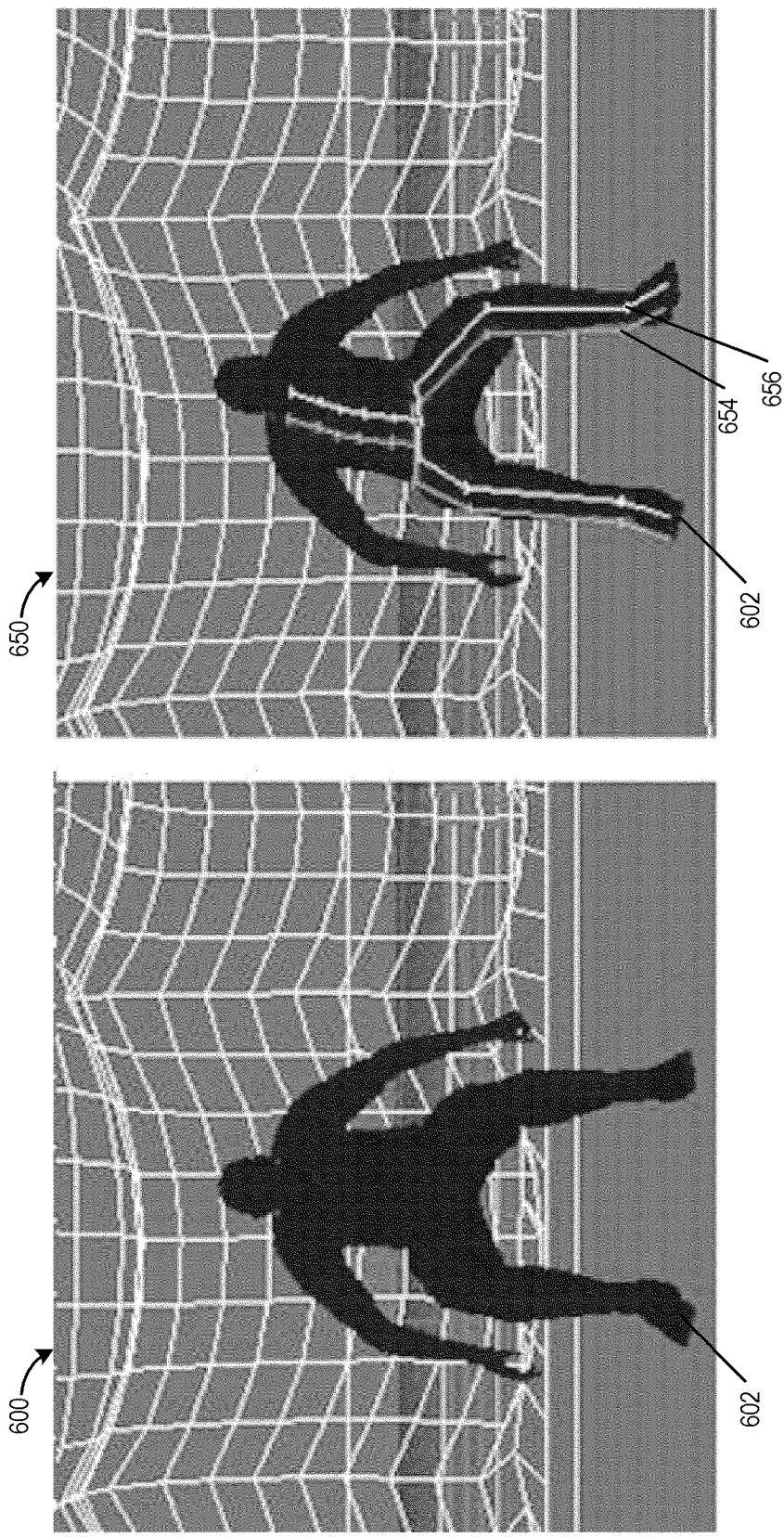
FIG. 6 illustrates an embodiment of one comparative example of a frame generated using the kinetic energy smoother.

FIG. 6 illustrates an embodiment of one comparative example of a frame generated using the kinetic energy smoother 202. The frame 600 illustrates a first pose of a character 602. In this particular non-limiting example, the character is a goalie in a soccer game. The frame 650 illustrates a second pose of the character 602. In the frame 650, the character 602 is side stepping. The wireframe 654 includes a number of joints and rods representative of the character 602. Further, the wireframe 654 shows the pose for the character 602 without using the kinetic energy smoother 202. In contrast, the wireframe 656 shows the pose for the character 602 when the kinetic energy smoother 202 is used. The wireframe 656 represents the result of a motion that appears more realistic based on how a human would move compared to the movement represented by the wireframe 654. Advantageously, the more realistic movement is generated without the use of a physics engine reducing the amount of computing resources, including processor resources used, to generate the frame.

Figure 7:
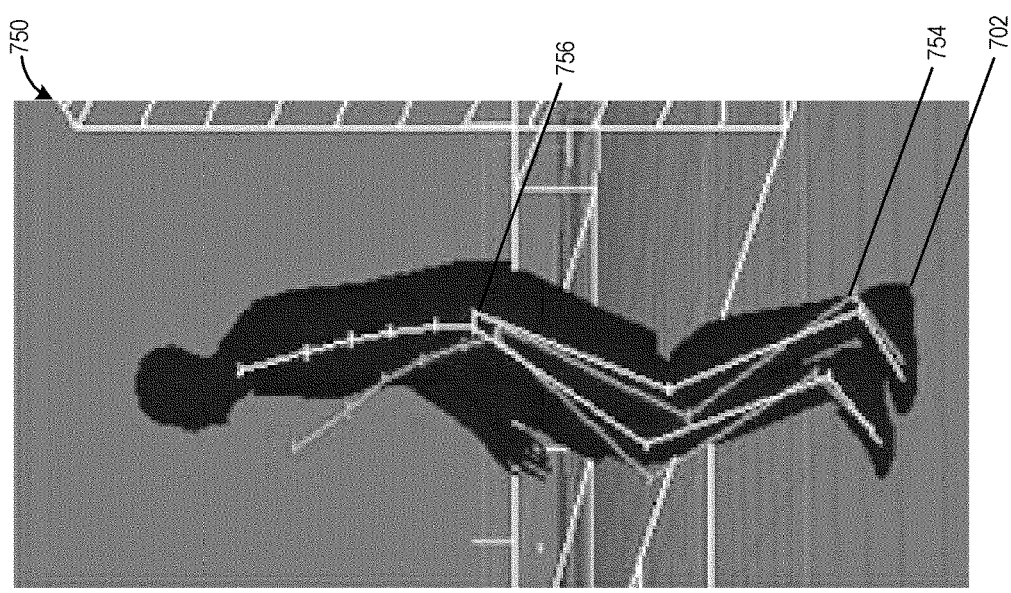
FIG. 7 illustrates another embodiment of a comparative example of a frame generated using the kinetic energy smoother.
Figure 7:
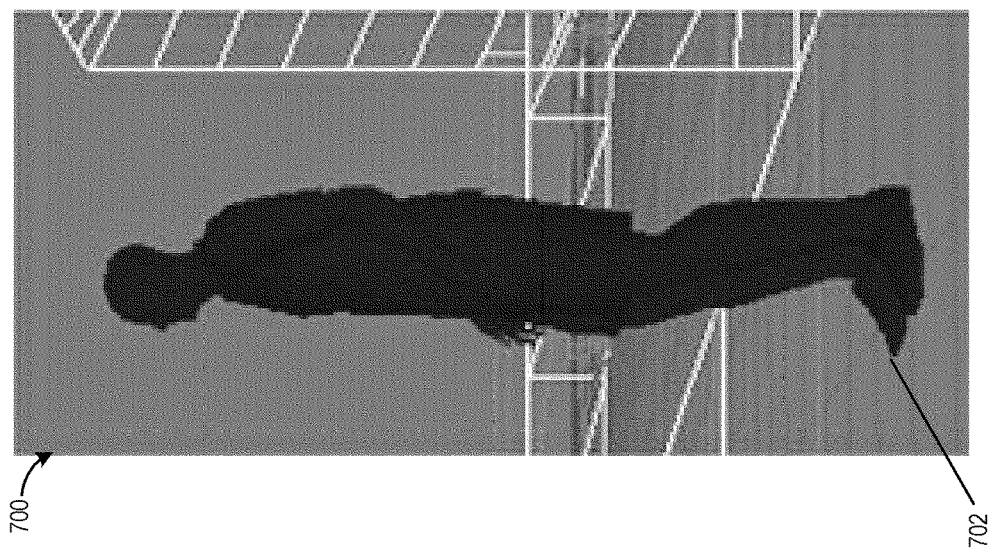

FIG. 7 illustrates another embodiment of a comparative example of a frame generated using the kinetic energy smoother 202. The frame 700 illustrates a first pose of a character 702 that is standing. The frame 750 illustrates a second pose of the character 702 that is beginning a jump. The wireframe 754 illustrates the pose for the character 702 without using the kinetic energy smoother 202. In contrast, the wireframe 756 shows the pose for the character 702 when the kinetic energy smoother 202 is used. In some cases, both poses are physically possible by a real human, but the rate of transition between the poses may not be realistic. For example, supposing that the frame 750 is the frame that is generated immediately subsequent to the frame 700, the time difference between the two frames may be $\frac{1}{30}^{th}$ of a second. In such a case, it may be unrealistic for the character 702 to have moved as quickly as the wireframe 754 would indicate. As with the example in FIG. 6, the more realistic jump movement represented by the wireframe 756 can be generated without the use of a physics engine reducing the computational resources utilized by the game that generated the character 702 movement.

Overview of Game System

Figure 8:
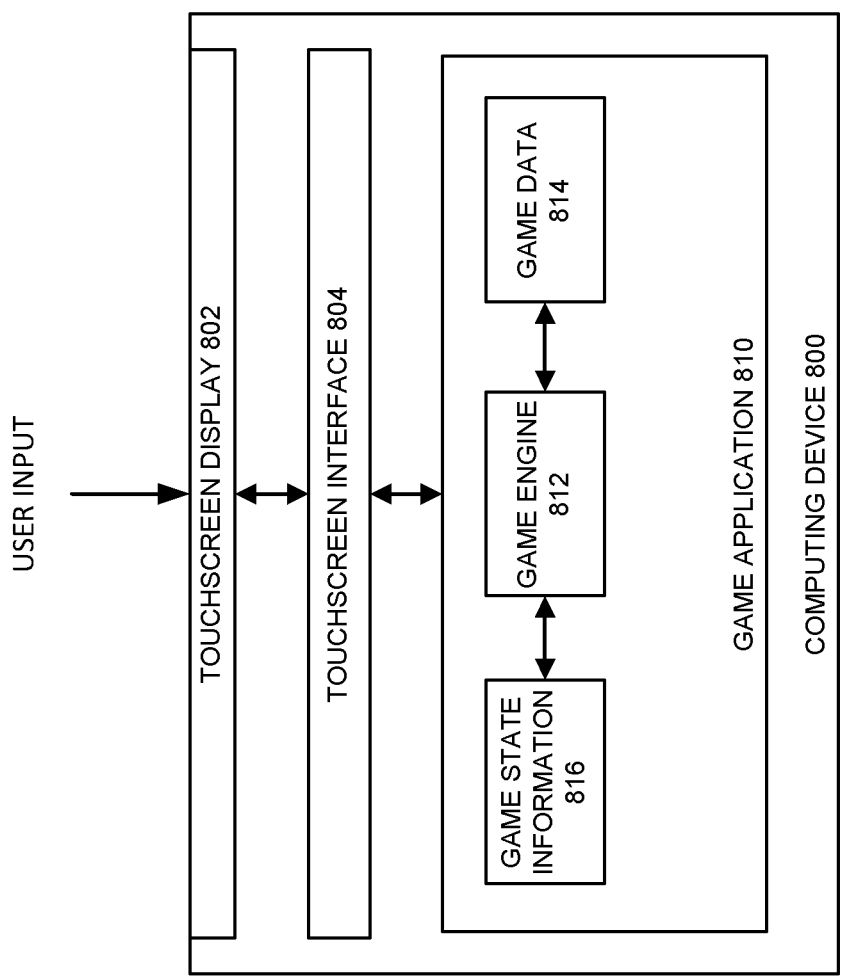
FIG. 8 illustrates an embodiment of a computing device.

FIG. 8 illustrates an embodiment of a computing device 800, also referred to as a gaming system. The computing device 800 can be an embodiment of a computing system that can execute the game system 100. In the example of FIG. 8, the computing device 800 is a touch-capable computing device capable of receiving input from a user via a touchscreen display 802. However, the computing device 800 is not limited as such and may include non-touch capable embodiments, which do not include a touchscreen display 802.

The computing device 800 includes a touchscreen display 802 and a touchscreen interface 804, and is configured to execute a game application 810. In certain embodiments, the game application 810 may be or may embody the game system 100 and may include some or all of the embodiments described with respect to the game system 100 including, for example, animation engine 112, which may include the kinetic energy smoother 202. Although described as a game application 810, in some embodiments the application 810 may be another type of application that generates procedural animation from motion capture data, such as educational software or movie animation software. While computing device 800 includes the touchscreen display 802, it is recognized that a variety of input devices may be used in addition to or in place of the touchscreen display 802.

The computing device 800 can include one or more processors, such as central processing units (CPUs), graphics processing units (GPUs), and accelerated processing units (APUs). Further, the computing device 800 may include one or more data storage elements. In some embodiments, the computing device 800 can be a specialized computing device created for the purpose of executing game applications 810. For example, the computing device 800 may be a video game console. The game applications 810 executed by the computing device 800 may be created using a particular application programming interface (API) or compiled into a particular instruction set that may be specific to the computing device 800. In some embodiments, the computing device 800 may be a general purpose computing device capable of executing game applications 810 and non-game applications. For example, the computing device 800 may be a laptop with an integrated touchscreen display or desktop computer with an external touchscreen display. Components of an example embodiment of a computing device 800 are described in more detail with respect to FIG. 9.

The touchscreen display 802 can be capacitive touchscreen, a resistive touchscreen, surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 802. The touchscreen interface 804 can be configured to translate the touch input into data and output the data such that it can be interpreted by components of the computing device 800, such as an operating system and the application 810. The touchscreen interface 804 can translate characteristics of the tactile touch input touch into touch input data. Some example characteristics of a touch input can include, shape, size, pressure, location, direction, momentum, duration, and/or other characteristics. The touchscreen interface 804 can be configured to determine the type of touch input, such as, for example a tap (for example, touch and release at a single location) or a swipe (for example, movement through a plurality of locations on touchscreen in a single touch input). The touchscreen interface 804 can be configured to detect and output touch input data associated with multiple touch inputs occurring simultaneously or substantially in parallel. In some cases, the simultaneous touch inputs may include instances where a user maintains a first touch on the touchscreen display 802 while subsequently performing a second touch on the touchscreen display 802. The touchscreen interface 804 can be configured to detect movement of the touch inputs. The touch input data can be transmitted to components of the computing device 800 for processing. For example, the touch input data can be transmitted directly to the application 810 for processing.

In some embodiments, the touch input data can undergo processing and/or filtering by the touchscreen interface 804, an operating system, or other components prior to being output to the game application 810. As one example, raw touch input data can be captured from a touch input. The raw data can be filtered to remove background noise, pressure values associated with the input can be measured, and location coordinates associated with the touch input can be calculated. The type of touch input data provided to the game application 810 can be dependent upon the specific implementation of the touchscreen interface 804 and the particular API associated with the touchscreen interface 804. In some embodiments, the touch input data can include location coordinates of the touch input. The touch signal data can be output at a defined frequency. Processing the touch inputs can be computed many times per second and the touch input data can be output to the game application for further processing.

A game application 810 can be configured to be executed on the computing device 800. The game application 810 may also be referred to as a videogame, a game, game code and/or a game program. A game application should be understood to include software code that a computing device 800 can use to provide a game for a user to play. A game application 810 might comprise software code that informs a computing device 800 of processor instructions to execute, but might also include data used in the playing of the game, such as data relating to constants, images and other data structures. For example, in the illustrated embodiment, the game application includes a game engine 812, game data 814, and game state information 816.

The touchscreen interface 804 or another component of the computing device 800, such as the operating system, can provide user input, such as touch inputs, to the game application 810. In some embodiments, the computing device 800 may include alternative or additional user input devices, such as a mouse, a keyboard, a camera, a game controller, and the like. A user can interact with the game application 810 via the touchscreen interface 804 and/or one or more of the alternative or additional user input devices. The game engine 812 can be configured to execute aspects of the operation of the game application 810 within the computing device 800. Execution of aspects of gameplay within a game application can be based, at least in part, on the user input received, the game data 814, and game state information 816. The game data 814 can include game rules, prerecorded motion capture poses/paths, environmental settings, constraints, animation reference curves, skeleton models, and/or other game application information.

The game engine 812 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 810, the game application 810 can store game state information 816, which can include character states, environment states, scene object storage, and/or other information associated with a state of execution of the game application 810. For example, the game state information 816 can identify the state of the game application at a specific point in time, such as a character position, character action, game level attributes, and other information contributing to a state of the game application.

The game engine 812 can receive the user inputs and determine in-game events, such as actions, collisions, runs, throws, attacks and other events appropriate for the game application 810. During operation, the game engine 812 can read in game data 814 and game state information 816 in order to determine the appropriate in-game events. In one example, after the game engine 812 determines the character events, the character events can be conveyed to a movement engine that can determine the appropriate motions the characters should make in response to the events and passes those motions on to an animation engine 112. The animation engine 112 can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Overview of Computing Device

Figure 9:
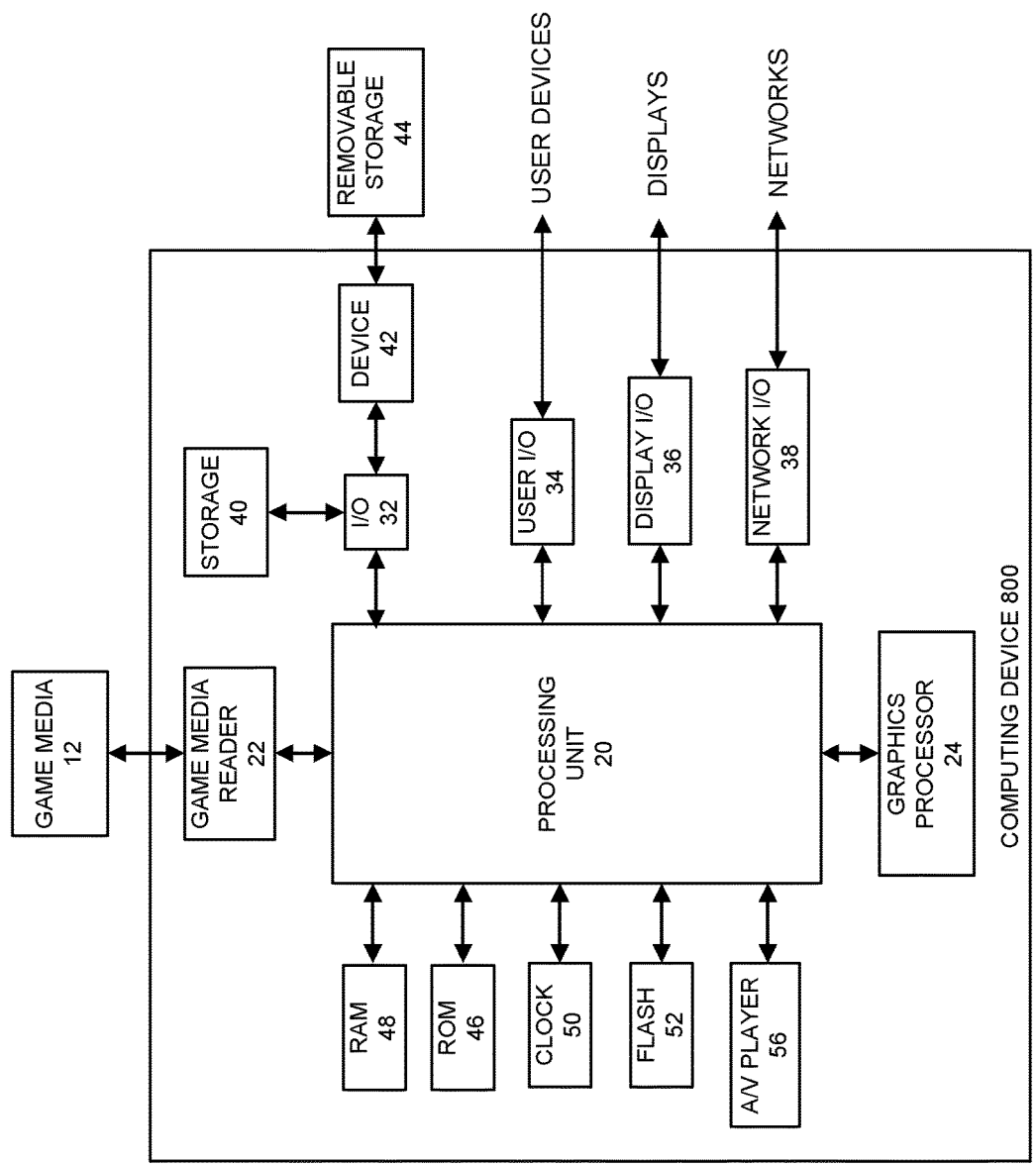
FIG. 9 illustrates additional example details of the embodiment of the computing device presented in FIG. 8.

FIG. 9 illustrates additional example details of the embodiment of the computing device 800 presented in FIG. 8 according to the present disclosure. Other variations of the computing device 800 may be substituted for the examples explicitly presented herein, such as removing or adding components to the computing device 700. The computing device 800 may include a game device, a smart phone, a tablet, a personal computer, a laptop, a smart television, a car console display, and the like. Further, (although not explicitly illustrated in FIG. 9) as described with respect to FIG. 8, the computing device 800 may optionally include a touchscreen display 802 and a touchscreen interface 804.

As shown, the computing device 800 includes a processing unit 20 that interacts with other components of the computing device 800 and also external components to the computing device 800. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing device 800 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing device 400 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device. Computing device 800 might be a handheld video game device, a dedicated game console computing system, a general-purpose laptop or desktop computer, a smart phone, a tablet, a car console, or other system capable of executing one or more game applications or other types of applications.

The computing device 800 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 800. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. Computing device 800 may comprise one or more integrated displays configured to receive display output signals produced by the display I/O 36, which may be output for display to a user. According to some embodiments, display output signals produced by the display I/O 36 may also be output to one or more display devices external to the computing device 800.

The computing device 800 can also include other features that may be used with a game, such as a clock 50, flash memory 52, and other components. An audio/video player 56 might also be used to play a video sequence, such as a movie. It should be understood that other components may be provided in computing device 800 and that a person skilled in the art will appreciate other variations of computing device 800.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing device 800 is turned off or loses power.

As computing device 400 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by a user computing device configured with specific computer-executable instructions,
accessing a first frame that includes a first pose of a representation of a human;
generating a second frame that includes a second pose of the representation of the human, the second pose based on motion of at least a portion of the representation of the human;
determining a velocity of the motion of the portion of the representation of the human by at least comparing the first pose to the second pose;
calculating a kinetic energy value for the portion of the representation of the human based at least in part on the velocity;
comparing the kinetic energy value to a reference animation curve corresponding to the portion of the representation of the human;
determining whether the kinetic energy value satisfies the reference animation curve; and
in response to determining that the kinetic energy value does not satisfy the reference animation curve, resampling animation data corresponding to the representation of the human to create an updated second frame.

2. The computer-implemented method of claim 1, wherein the reference animation curve comprises a mapping between kinetic energy values and resampling times.

3. The computer-implemented method of claim 2, wherein the mapping between the kinetic energy values and the resampling times is generated based at least in part on realistic motion for the human.

4. The computer-implemented method of claim 1, wherein determining whether the kinetic energy value satisfies the reference animation curve comprises determining whether a weight corresponding to an adjustment of a sampling time satisfies a sampling time threshold.

5. The computer-implemented method of claim 1, wherein resampling the animation data corresponding to the representation of the human to create the updated second frame comprises:
 determining a resampling time from the reference animation curve based at least in part on the calculated kinetic energy value;
 resampling the animation data based on the resampling time to obtain an animation frame; and
 creating the updated second frame based at least in part on the animation frame as the updated second frame.

6. The computer-implemented method of claim 5, wherein creating the updated second frame further comprises merging the animation frame with additional image data included in the second frame.

7. The computer-implemented method of claim 1, wherein determining a velocity of the motion of the portion of the representation of the human comprises determining a joint velocity for each joint in a plurality of joints associated with the portion of the representation of the human, and wherein calculating the kinetic energy value for the portion of the representation of the human comprises:
 calculating, for each of joint in the plurality of joints, a joint kinetic energy value using the joint velocity for the joint;
 aggregating each of the joint kinetic energy values to obtain an aggregate kinetic energy value; and
 using the aggregate kinetic energy value as the kinetic energy value.

8. The computer-implemented method of claim 1, wherein the second frame is generated without using a physics engine.

9. The computer-implemented method of claim 1, wherein the kinetic energy value comprises, at least in part, a rotational kinetic energy value.

10. A system comprising:
 an electronic data store configured to store an application that performs procedural animation, the electronic data store comprising non-volatile memory;
 a hardware processor in communication with the electronic data store, the hardware processor configured to execute specific computer-executable instructions to at least:
  access a first frame generated by the application, the first frame including a first pose of a digital object comprising a first part and a second part;
  generate a second frame that includes a second pose of the digital object, the second pose based on motion of the first part with respect to the second part;
  determine a velocity of the motion of the first part by at least comparing the first pose to the second pose;
  calculate a kinetic energy value for the first part based at least in part on the velocity of the first part;
  determine whether the kinetic energy value satisfies a reference animation curve corresponding to the first part; and
  in response to determining that the kinetic energy value does not satisfy the reference animation curve, resample a set of motion capture data corresponding to the digital object to be included in an updated second frame.

11. The system of claim 10, wherein the hardware processor is further configured to determine whether the kinetic energy value satisfies the reference animation curve by at least:
 accessing a multiplier corresponding to the kinetic energy value in the reference animation curve, the multiplier corresponding to a sampling time adjustment; and
 determining whether an absolute difference between the multiplier and one exceeds a resampling threshold.

12. The system of claim 11, wherein the hardware processor is further configured to resample the set of motion capture data by at least:
 modifying a sampling period based on the multiplier to obtain a resample time period;
 sampling the set of motion capture data at the resample time period to obtain a set of motion capture poses for the digital object;
 blending the set of motion capture poses to create a composite motion capture pose for the digital object; and
 including the composite motion capture pose in the updated second frame.

13. The system of claim 12, wherein including the composite motion capture pose in the updated second frame further comprises combining the composite motion capture pose with additional images included as part of the second frame.

14. The system of claim 10, wherein the first part comprises a plurality of joints and wherein the hardware processor is further configured to determine the kinetic energy value for the first part by:
 determining a component kinetic energy value for each joint in the plurality of joints; and
 generating the kinetic energy value by aggregating the component kinetic energy value for each joint in the plurality of joints.

15. The system of claim 10, wherein the reference animation curve is generated automatically using a machine learning algorithm based at least in part on an evaluation of digital object poses for a representative digital object.

16. A non-transitory computer-readable storage medium storing computer executable instructions that, when executed by one or more computing devices, configure the one or more computing devices to perform operations comprising:
 accessing a first pose of a digital object comprising a first part and a second part;
 generating a second pose of the digital object, the second pose based on motion of the first part with respect to the second part;
 determining a kinetic energy value for the first part based at least in part on a difference in a first location of the first part in the first pose and a second location of the first part in the second pose;
 determining whether the kinetic energy value satisfies a reference kinetic energy mapping corresponding to the first part; and
 in response to determining that the kinetic energy value does not satisfy the reference kinetic energy mapping, resampling a set of motion capture data corresponding to the digital object to obtain an updated second pose of the digital object.

17. The computer-readable, non-transitory storage medium of claim 16, wherein determining whether the kinetic energy value satisfies the reference kinetic energy mapping comprises:
 accessing an adjustment value corresponding to the kinetic energy value in the reference kinetic energy mapping, the adjustment value corresponding to a sampling time adjustment; and determining whether the adjustment value exceeds an adjustment threshold.

18. The computer-readable, non-transitory storage medium of claim 17, wherein resampling the set of motion capture data comprises:
  modifying a sampling time period used to generate the second pose based on the adjustment value to obtain a modified sampling time period;
  sampling the set of motion capture data using the modified sampling time period to obtain a set of motion capture poses for the digital object; and
  generating the updated second pose using the set of motion capture poses.

19. The computer-readable, non-transitory storage medium of claim 16, further comprising incorporating the updated second pose of the digital object into a frame comprising a plurality of digital objects.

20. The computer-readable, non-transitory storage medium of claim 16, wherein the first part comprises a plurality of subparts and wherein determining the kinetic energy value for the first part comprises:
  determining a component kinetic energy value for at least some of the subparts of the plurality of subparts; and
  determining the kinetic energy value by aggregating the component kinetic energy values for the at least some of the subparts of the plurality of subparts.

* * * * *